May 10, 1966  N. HARTLEY  3,250,287
MOISTURE CONTROLLER FOR CONTINUOUS MIXING
Filed July 2, 1962  7 Sheets-Sheet 1

INVENTOR.
NELSON HARTLEY
BY
Wheeler, Wheeler, and Wheeler
ATTORNEYS

May 10, 1966 N. HARTLEY 3,250,287
MOISTURE CONTROLLER FOR CONTINUOUS MIXING
Filed July 2, 1962 7 Sheets-Sheet 4

INVENTOR.
NELSON HARTLEY
BY
Wheely, Wheeler & Wheeler
ATTORNEYS

May 10, 1966  N. HARTLEY  3,250,287
MOISTURE CONTROLLER FOR CONTINUOUS MIXING
Filed July 2, 1962  7 Sheets-Sheet 5

May 10, 1966 N. HARTLEY 3,250,287
MOISTURE CONTROLLER FOR CONTINUOUS MIXING
Filed July 2, 1962 7 Sheets-Sheet 6

INVENTOR.
NELSON HARTLEY
BY
Wheeler, Wheeler & Wheeler
ATTORNEYS

May 10, 1966  N. HARTLEY  3,250,287
MOISTURE CONTROLLER FOR CONTINUOUS MIXING
Filed July 2, 1962  7 Sheets-Sheet 7

INVENTOR.
NELSON HARTLEY
BY
Wheeler, Wheeler + Wheeler
ATTORNEYS

United States Patent Office 3,250,287
Patented May 10, 1966

---

3,250,287
MOISTURE CONTROLLER FOR CONTINUOUS MIXING
Nelson Hartley, Baltimore, Md., assignor to Hartley Controls Corporation, Neenah, Wis., a corporation of Wisconsin
Filed July 2, 1962, Ser. No. 206,722
5 Claims. (Cl. 137—90)

This invention relates to a multi-coil relay and an integrating circuit for a continuous mixing operation.

Cross reference is made to my copending applications, Serial No. 159,183, filed December 13, 1961; Serial No. 656,592, filed May 2, 1957, now abandoned and Serial No. 739,251, filed June 2, 1958, now abandoned of which this application is a continuation-in-part.

The disclosure exemplifies the invention by reference to a device for continuously measuring the heat and moisture content of relatively finely divided granular materials such as sand, or mineral, or clay, and then continuously adding water to such material during the continued movement of the material and in proportions correlated to the integrated values of moisture content and temperature as integrated electrically in a special relay.

Provision is made for shutting off the system and the water supply whenever movement of the material is interrupted. However, assuming that the movement of the material is continuous, the measurement is continuous and the flow of water is continuous, the rate of flow, however, being controlled by the integrating relay.

In one embodiment of the invention, the relay comprises a pair of opposed coils respectively energized according to the factors to be integrated and an armature floating between said coils in a position determined by their respective energization. The floating armature acts upon a contactor having two positions of pivotal movement to close one circuit or another depending on whether it is free to respond to its bias or whether it is acted upon by said armature. The contactor is further movable bodily upon a contact carried which also supports the terminal contacts with which the contactor alternatively coacts. The bodily movement of the carrier and contactor is effected by a motor which is energized to turn a screw in one direction or the other to advance or retract the contactor while, at the same time, opening or closing the control valve. Thus, at all times, the position of advance or retraction of the contact carrier corresponds to the position of the flow control valve, whereby the solenoid armature, which constitutes the contact actuator, must move a greater or lesser distance before engaging the contactor to move it from its normally biased position of engagement with one of the terminal contacts in order to effect engagement of the contactor with the other of the terminal contacts.

In the embodiment of the invention to which reference has just been made, mechanical contact elements are provided. In another embodiment of the invention, the mechanical contact elements are replaced by a photoelectric cell type of switch. As used herein, the terms "contactor" and "switch" are intended to include all equivalent structure. The photocell units are desirably so mounted as to be readily adjustable as to the spacing therebetween. This adjustment is effective to change the range of carrier movement in response to sequential actuation of the photocell switches.

In more advanced embodiments of the invention, a third coil is added to the relay. The thrust of the third coil is desirably adjusted to more or less exactly balance the weight of the armature. The armature will ordinarily move on a vertically oriented path. Accordingly, the coils which respond to moisture and temperature variations act upon the armature independently of the force of gravity. This will greatly increase the range within which the relay is sensitve. Moreover, adjustment of the level of energization of the third coil can be utilized to damp armature movement in response to the thrust of the other coils.

In one embodiment of the invention, the water valve is actuated directly by the reversible motor which operates the carrier. In another embodiment of the invention, remote control of the valve is effected, desirably through a pneumatic system.

An important feature of certain apparatus embodying the invention is its adaptability for use as a direct reading indicator and recorder. The indicator can be made to respond to the varying air pressure in the remote control mechanism aforesaid, or can be made to respond directly to rotation of the motor driven shaft.

The embodiments shown in FIGS. 1–3 will first be described.

By way of exemplification, the material to be measured and treated is passed through the measurement and treatment zone on a conveyor 10 operated by a motor 11 across which there is connected a solenoid 12 controlling a switch 13 biased to normally open position and held shut by the solenoid only as long as the motor 11 is energized. The switch 13 controls the flow of current from the source 14 and a manually operable master switch 15 so that the apparatus embodying the invention is disconnected if, for any reason, the conveyor 10 ceases to operate.

Current from the source 15 energizes a transformer at 16 which energizes instruments which respectively sense the temperature and moisture of the continuously moving sand or other work material on the conveyor, the variable responses of these instruments being integrated electrically, and the integrated result being used to vary the volume of substantially continuous flow of water to the material.

The terminal 17 of secondary 18 is connected with a plow electrode 19 engaged centrally of conveyor 10 by the material which is being advanced by the conveyor. The thermistor 20 transmits from the plow electrode 19 an amount of current proportioned to the temperature of the same or other material on the conveyor, as disclosed in my copending application Serial No. 656,592, filed May 2, 1957. This current passes through the conductor 21 to a bank of rectifiers 22 which is connected through the transformer 23 with terminal 24 of the supply source represented by the secondary 18 of transformer 16. In practice, transformer 23 may be an auto-transformer. As used commercially, it has 14 volt and 25 volt taps. The arrangement passes A.C. current through the thermistor 20 and supplies D.C. current of variable voltage controlled by the thermistor to the lower winding 25 of the integrating relay 30.

Current from the plow electrode 19 also passes through the sand to the probes or electrodes 31 at a rate determined by the resistance of the sand. The sand resistance is inverse to its moisture content. Thus, the current flow between plow electrode 19 and probe electrodes 31 is a function of the moisture content of the material on the conveyor. The probe electrodes 31 are connected in parallel to each other to a conductor 32 leading to a rectifier bank 33 which is connected with the upper coil 35 of the integrating relay 30. As explained in the companion application above identified, it is very desirable to pass alternating current through the material to obtain flow proportioned to its moisture content. As in the case of coil 25, the rectifiers in bank 33 deliver direct current to the coil 35 alternately from the probe electrodes 31 and the supply transformer terminal 24.

The line 34 from the supply transformer terminal 24 leads to the contact 36 of a potentiometer 37 whereof the moving contactor 38 is connected to the rectifier bank 33, the remaining terminal 39 being connected through variable resistor 40 back to transformer terminal 17.

The variable resistor 40 is used for calibration of the device according to the material to be handled. Its moving contactor 41 is connected with the adjusting screw 42 on the panel 45 of FIG. 1. After calibration is achieved, the position of the moving contactor 41 remains unchanged and it is possible for the operator to vary at will the amount of moisture supplied to the material on the conveyor by simply adjusting the moving contact 38 of potentiometer 37. This is done by means of knob 50 on the control panel. The knob has a pointer 51 operating over a scale 52 whose calibrations are indicative of the amount of moisture to be achieved as a result of the water added.

The windings of coils 25 and 35 are opposed. When they are both energized, the armature 55 floats within the relay and is sensitively responsive as to its position according to variations in the relative energization of the respective coils 25 and 35. In the embodiment of FIGS. 1–3 inclusive, the coil axis is vertical and the armature moves vertically, being biased solely by its own weight.

Reciprocably mounted in a position spaced from the armature 55 to move toward and from the solenoid 30 is a contact carrier 56 restrained against rotation, as by rods 57, and provided with a sleeve nut 58 engaged with screw 59 on the armature shaft of reversible motor 60, whereby rotation of the motor armature shaft in either direction will move the contact carrier 56 to or from the solenoid 30.

Pivotally mounted on the post 61 is a contactor 62 selectively engageable with contacts 63 and 64 of the contact carrier having a circuit connection comprising a flexible conductor 65. The nut 67 disposed in the path of the solenoid armature 55 is adapted to receive the thrust of said armature and also it has sufficient weight to bias the contactor 62 to a tilted position in which it is in engagement normally with contact 63. Only when engaged by the armature does the contactor oscillate counterclockwise as viewed in FIG. 2 to break the circuit to contact 63 and to close the circuit to contact 64.

As will hereinafter be made clear, the engagement of the contactor with contact 63 energizes the motor 60 in a direction to open the flow controlling valve 70, while engagement of the contactor with contact 64 operates motor 60 in a direction to reduce flow through the valve 70. When the floating armature 55 of the solenoid holds the contactor 62 in a substantially horizontal position in which it engages neither of the contacts 63 or 64, the motor 60 will be at rest and the flow control valve will remain in status quo.

The flow control valve 70 is in series with a valve 71 in a water line 72 leading to a spray head 73 arranged to discharge water onto the work material on the conveyor 10. The valve 70 has a screwthreaded stem 75 connected by shaft 76 and spiral gearing at 77 with the armature shaft of motor 60, whereby any rotation of the motor in either direction will open or close valve 70 to and from its seat in the casing 69. Since any rotation of the armature shaft of motor 60 is also communicated through screwthreads 59 and nut 58 to the floating contact carrier 56, and since the relative directions of movement are such as to tend to open the circuit following each motor operation, it will be evident that a very delicate control is achieved, whereby the rate of flow of water is at all times closely related to the integrated values of currents acting oppositely on the armature and respectively related to temperature and to the original moisture content of the work material.

Starting with a position in which the contactor 62 is horizontal, its weighted portion 67 resting on the solenoid armature 65, and neither of the contacts 63 or 64 being engaged, either a decrease in temperature or an increase in moisture of the mateiral passing the electrodes 19 and 31 will, by decreasing the energization of coil 25, or by increasing the energization of coil 35, cause the floating armature 55 to move upwardly to engage contactor 62 with contact 64. This will rotate the shaft of motor 60 in a direction to close the valve 70.

However, the same movement which initiates the closing of the valve will also initiate the withdrawal of the contact carrier 56, breaking the connection between contact 64 and the contactor 62 as soon as the valve has closed sufficiently to compensate for the increase in moisture or decrease in temperature as sensed by the electrodes exposed to the work material. If the moisture content of the material continues to increase or its temperature continues to decrease, the solenoid 55 will show increased upward response, and the valve 70 will close further until this additional change has been compensated for in the flow controlled by valve 70.

On the other hand, if the moisture decreases or the temperature of the arriving material increases, the solenoid armature 55 will float in an increasingly lower position in the solenoid 30, thus temporarily providing no support for the contactor 62. The contactor will thereupon tilt pursuant to the bias provided by the weight of nut 67. This will engage the contactor with contact 63 to energize the motor 60 for rotation of its shaft in a direction to increase the opening of value 70 and at the same time to lower the contact carrier 56 and the contactor 62 until the latter re-engages with the armature in the new armature position. Thereupon the support provided to the end of the contactor as it engages the armature will reopen engagement of the contactor with contact 63 and the motor 60 will be brought to rest. Under all conditions, the arrangement makes the position of valve 70 correspond accurately to the integrated values of the current which flows in response to temperature and the current which flows in response to moisture.

Thus far the operation of the device has been described from the standpoint of its response to a plurality of sensing instruments energizing the respective coils of the integrating solenoid. However, it will be noted that because of the gravity bias of the armature, it is possible for the control of the flow valve to be made dependent upon the response of but one sensing instrument. For example, assuming the same connection of the moisture responsive sensing instrument to the upper coil of the solenoid, but assuming that the lower coil is left completely de-energized, it will be evident that the upper coil will act to raise the armature of the solenoid against its gravity bias, and the armature will act upon the contactor to energize the motor in a valve closing direction whenever the sensing instrument responds to show an increased moisture content in the work material.

If the sensing instrument shows decreased moisture content, the energization of the upper coil of the solenoid will be decreased, the armature will float at a lowered level thereby releasing the pressure on the contactor; the contactor will tilt pursuant to its own bias to close the circuit through contact 63 to energize the motor 60 for rotation of its valve in a direction to increase the opening of valve 70 and at the same time to lower the contact carrier 56 of the contactor 62. In other words, simply by proper calibration, it is possible to have the apparatus function in response to a single sensing instrument instead of integrating, and responding to, the current through a plurality of sensing instruments.

Limit switches protect valve 70 from being actuated beyond its fully open or fully closed positions. These limit switches are connected to relay circuits whereby a relatively small current controlled by the contactor 62 is made to regulate the current to the motor 60. The contact 63 is connected through limit switch 78, conductor 79, rectifier 80, relay 81 and relay 82 and conductor 83 to energize motor 60 in one direction. Contact 64 is connected through limit switch 84, conductor 85, rectifier 86, relay 87 and relay 88 and conductor 89 to energize motor 60 in the opposite direction of rotation. As illustrated, the several relays 81, 82, 87 and 88 receive current directly from the supply line 14 subject to the control of the master relay 12. Also supplied with current from the supply line, subject to such control, is the solenoid 90 of the shut-off valve 71 which completely cuts off the flow of water when the conveyor motor 11 is de-energized.

Figure 1:
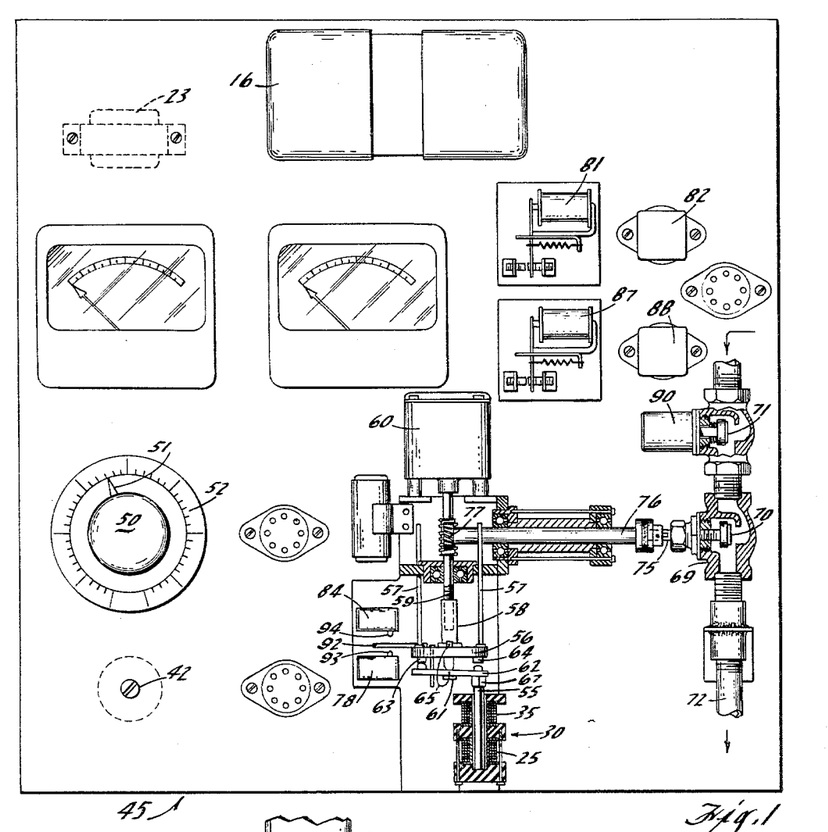
FIG. 1 is a view principally in front elevation and partially in section, showing a control panel of a device embodying the invention, the valves and their operating mechanisms being shown in section.

The push buttons of the respective limit switches 78 and 84 are in the path of movement of an arm 92 projecting laterally from the contact carrier 56 in a position such that at the extreme of carrier movement the arm will engage either the push button 93 of limit switch 78 or the push button 94 of limit switch 84 as clearly appears in FIG. 1.

Figure 2:
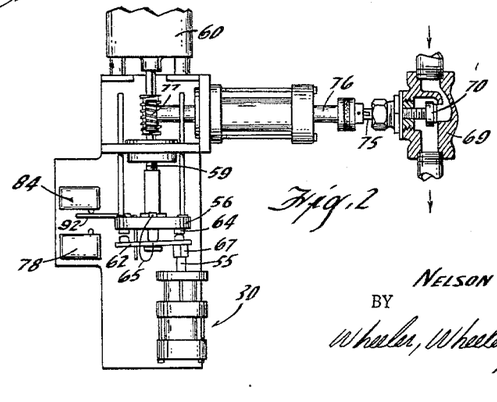
FIG. 2 is a fragmentary view similar to FIG. 1 showing the valves and operating parts in different positions.
Figure 3:
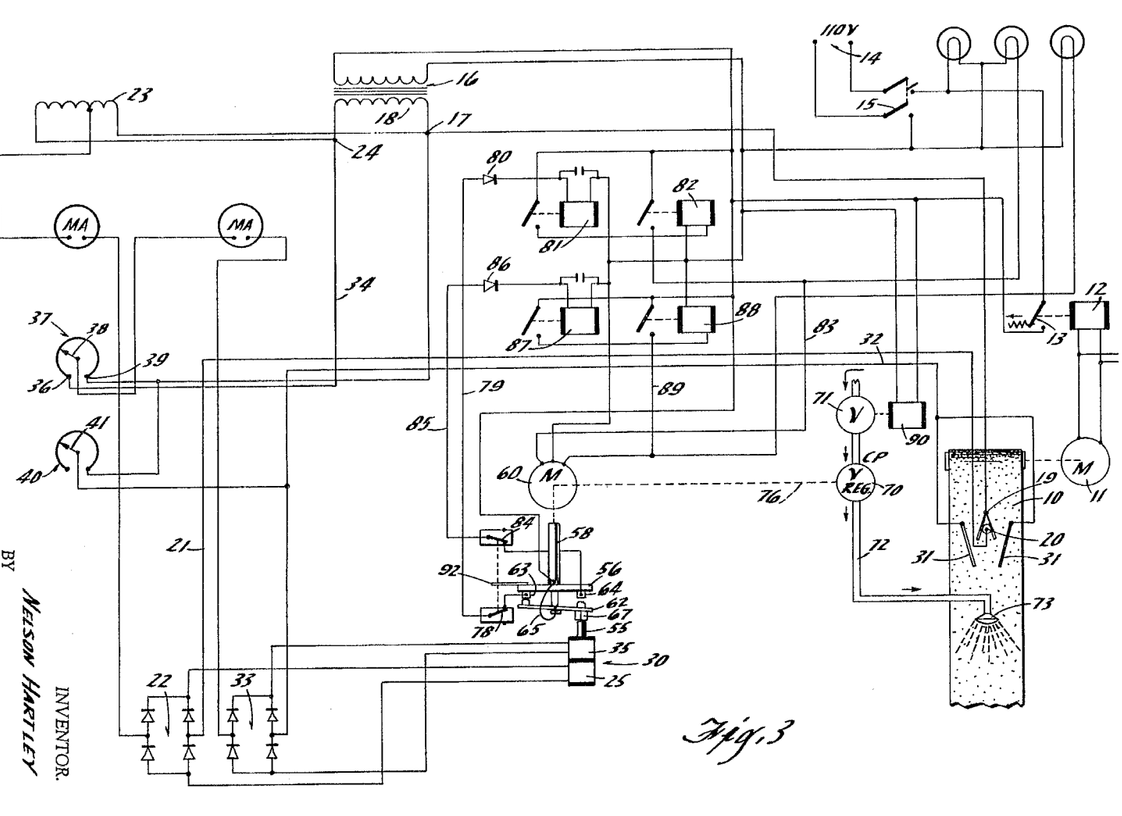
FIG. 3 is a circuit diagram in conjunction with a diagrammatic plan view of the material conveyor and moisture and temperature determining instruments and water spray head.

My dual coil relay may constitute a separate article of manufacture and, for purposes other than the device of FIGS. 1 to 3, it may take the form shown in FIGS. 4 to 7 inclusive. Specifically, I use for batch operations the snap-action, dual-coil relay now to be described. It differs from the floating-armature relay of FIGS. 1 to 3 principally in having steel polar caps which hold the armature in one of its extreme positions or the other, without permitting it to "float" in intermediate positions.

The coil 25 is wound on a spool 100 seated on annular polar base member 102. An intermediate polar member is provided at 103 connected by bolts 104 with member 102. The member 103 has an opening at 105 registering with the central opening 106 through spool 100. The bolts 104 also connect the parts to the horizontal arm 107 of a mounting bracket 108.

Figures 4, 5, 6, 7:
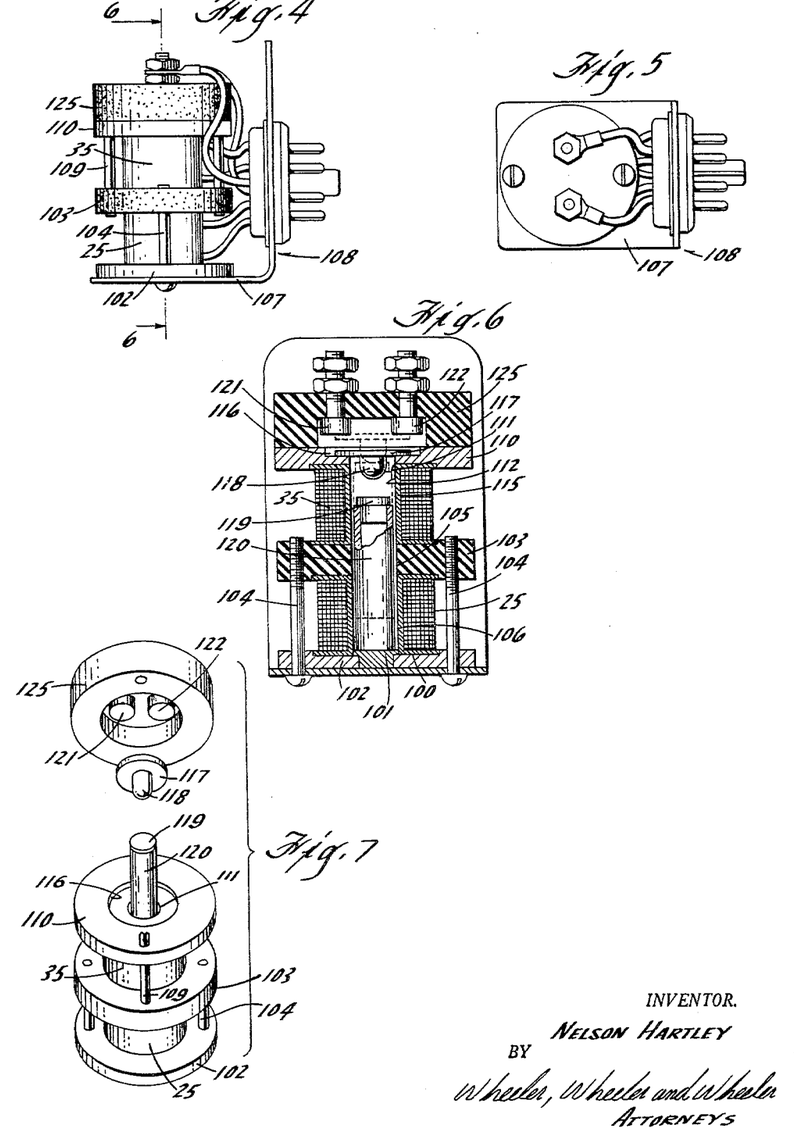
FIG. 4 is a view in side elevation of a somewhat different integrating solenoid embodiment.
FIG. 5 is a plan view of the device shown in FIG. 4.
FIG. 6 is a view on an enlarged scale taken in section on the line 6—6 of FIG. 4.
FIG. 7 is a view in perspective showing separated component parts of the device of FIGS. 4 to 6 inclusive.
Figure 8:
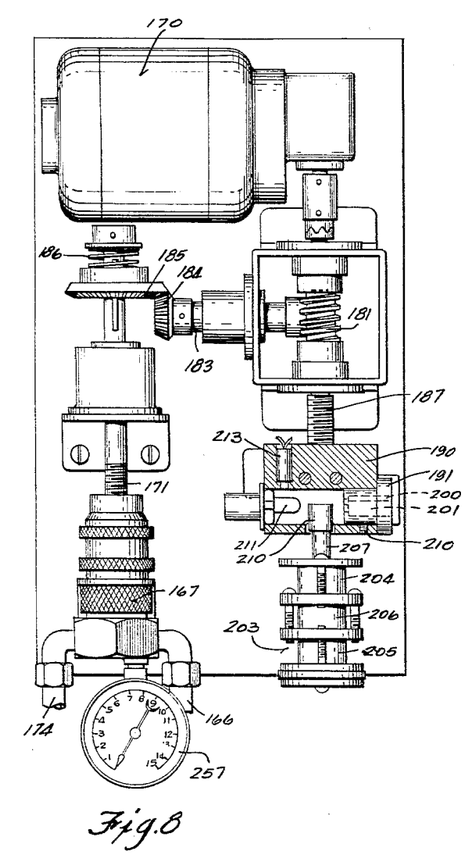
FIG. 8 is an elevation of a modified embodiment of the invention in which a triple coil relay is used and the mechanical contacts of the device shown in FIG. 1 are replaced by photocell switches.
Figure 9:
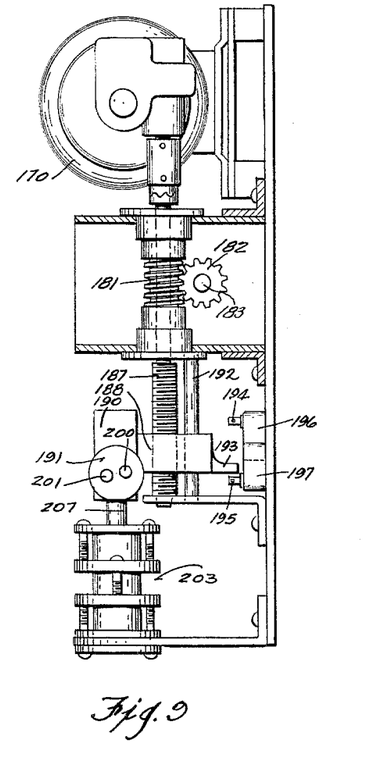
FIG. 9 is a side elevation of the device shown in FIG. 8.
Figure 10:
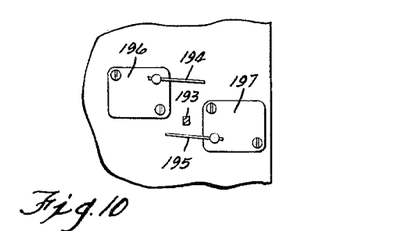
FIG. 10 is a diagrammatic view showing limit switches incorporated in the embodiment of FIGS. 8 and 9.

Bolts 109 connect the upper polar member 110 with the intermediate member 103 as best shown in FIG. 4. Member 110 is also provided with a central aperture at 111 registering with the aperture 112 of spool 115 upon which the upper coil 35 is wound. The several polar members 102, 103 and 110 are desirably counterbored to receive the heads of the spools 100 and 115.

The aligned openings through the spools and the polar members 103 and 110 provide a way in which the armature 120 of the solenoid is vertically reciprocable. In a central aperture in the bottom polar member 102, there is a non-magnetic insert plug 101 which, in practice, is made of fiber and upon which the armature seats in its lowermost position.

In a recess 116 with which the polar member 110 is provided, is a contactor 117 having a boss 118 in the path of movement of the head portion 119 of the armature 120 of this solenoid. When the armature rises to the position shown in dotted lines in FIG. 6, its non-magnetic cap 120' may engage the boss 119 to lift the contactor 117 to close a circuit between the terminal contacts 121 and 122 which are mounted in a socketed insulating cap member 125.

As in the construction originally described, the vertically reciprocable armature 120 is biased by its own weight, this being the desired but not necessarily the only arrangement of the parts. It is subject to opposing magnetic forces generated in the coils 25 and 35 of the solenoid, or either of these. It will normally assume a position which is a function of its bias and of the relative energization of the respective coils.

When the relative energization of coil 35 is increased or the relative energization of coil 25 is decreased, the solenoid will rise to close a circuit between terminals 121 and 122 by forcing the contactor 117 into engagement with the terminal contacts. Thus, the device shown in FIGS. 4 to 7 closes a circuit in response to the integrated effect of the currents flowing in two separate windings of the solenoid, but the arrangement is such that this occurs at only one value of integrated result, and there is no progressive movement of the parts as in the construction originally disclosed, wherein the closing of either circuit operates a motor to bring about an adjustment which also reopens the circuit until a new integrated value closes it again.

As a guide to the production of the dual coil relay, the following particulars are given with the understanding that these are by way of example, and not by way of limitation. In practice the coils are wound on ⅞ inch diameter spools with a 5/16 inch hole. The range of the coils can be varied greatly by the size of wire and the number of turns. In coils used in the foundry industry and the building block industry, No. 31 wire is employed with a number of turns to give a resistance of 70 ohms. The polar pieces are made of steel and are 1⅜ inches in diameter and ⅛ inch thick.

The spacer between the coils is ¼ inch thick and 1⅜ inches in diameter. Both the polar end members and the fiber spacer are recessed about 1/32 inch deep for the flanges of the coils to keep the coils in alignment. On top of the steel polar member of the upper coil, there is a ⅜ inch thick fiber cap carrying the two relay contacts. Intervening between this cap and the steel pole members is a ½ inch diameter stainless steel disc which serves as a contactor and has a 3/16 inch in diameter shaft projecting through the steel cap and constituting a boss to be engaged by the armature. The armature is made of ¼ inch steel tubing and is one inch long. It has a ⁹⁄₁₆ inch brass cap pressed into the upper end of the tubing to provide a nonmagnetic means of engaging the boss of the contactor.

With 20 ma. on the lower coil, it will require 100 ma. on the upper coil to close the contacts of this relay made according to the foregoing specifications. The amount of current needed to close the contacts can be decreased by increasing the length of the armature, or it may be increased by shortening the armature. With a one inch armature and a .018 spacer on the lower plate, the response of the armature will be uniformly proportioned to variations in current flow in the respective coils above the base rate specified. Thus, if the current on the lower coil is increased by 60 ma., it will also require 60 more ma. across the top coil to close the contacts. If the thickness of the spacer beneath the bottom coil is decreased, the ratio of increase required in the top coil in proportion to increase of current on the lower coil will be increased.

Because it is impossible to get the coils wound commercially to exact specifications, I provide armatures 120 and spacing plug 101 which defer slightly in dimensions so that I can increase or decrease the length of the armature and increase or decrease the thickness of the plug 101 by a few thousandths of an inch in each case. For example, the lower the lever at which the brass insert plug 101 supports the armature, the greater the differential will have to be between the upper and lower coils in order to lift the armature. Similarly, if the upper coil has an undue advantage over the lower coil, this advantage may be reduced by increasing the length of the armature by one or more thousandths of an inch. In order to maintain the balance between the upper and lower coils throughout the range of operation, the relays are calibrated in the course of manufacture by supplying armature and bottom inserts of the required dimensions.

Calibration in each field presents a different problem and is usually met by varying the rheostat voltage. Where the temperature sensing instrument is acting on sand or a material which has sand as its basic ingredient, the voltage is ordinarily set at 14 volts. In the tile industry where the basic material is talc and clay, the temperature sensing instrument is subjected to 25 volts.

In this particular instrument, the responsive involves snap action. When the current flowing through the top coil overpowers the holding current in the lower coil, the armature jumps up sharply to close the circuit.

In the embodiments of the invention shown in FIGS. 8–12 and 15–18, the combined temperature and moisture probe 150 is mounted in a continuous mixer 151. The probe 150 may have the construction shown in my copending application Serial No. 159,183, filed December 13, 1961.

The mixer 151 is generally in the form of a figure "8" in plan and has two communicating container lobes 152, 153. Each lobe has rotating mulls 154. The material to be mixed with the water is admitted through inlet port 155 and is discharged continuously through outlet port 156 after traversing a figure "8" pattern through the mixer.

Probe 150 is mounted on an arm 157 on one or the other of the mulls 154 and is continuously exposed to freshly mixed material.

Water is added to the material in the mixer through water pipe 160, which discharges into head 161 from whence it is sprayed onto the material through the spouts 162.

The water derives from a source 163, the pressure of which is regulated by the pressure regulator 164. The quantity of water flowing through pipe 160 is controlled by the valve 165, the degree of opening of which is controlled by the pressure of air in line 166. Valve 165 is conventional. It is normally closed under pressure of a spring and is opened by air pressure. The air pressure in line 166 is determined by the adjustment of pressure regulator 167.

In this embodiment of the invention, the reversible motor 170 will regulate the air pressure in pipe 166 through the pressure regulator 167 by rotating the stem 171 which adjusts the tension on a spring 172 within the pressure regulator 167.

Figure 18:
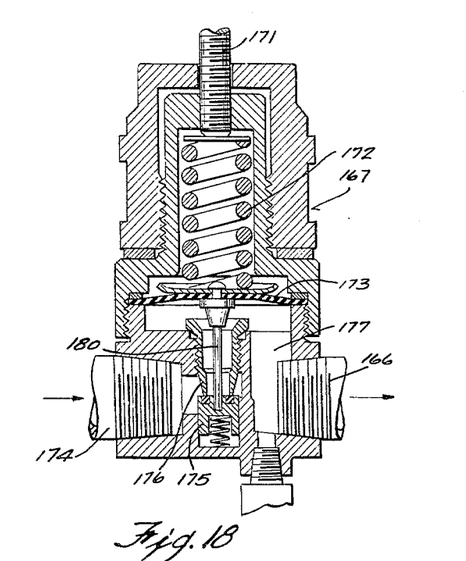
FIG. 18 is an axial cross section taken through an air pressure regulator used in the remote control of the water valve which supplies the mixer.

The pressure regulator 167 is of conventional construction, as shown in FIG. 18 and includes a diaphragm 173 which is subject to the tension of spring 172.

Relatively high pressure air is admitted into regulator 167 from air supply pipe 174. The incoming air must pass between a valve plug 175 and valve seat 176, en route to a low pressure chamber 177 within regulator body. Valve plug 175 is connected by a valve stem 180 to the diaphragm 173.

If it is desired to increase the rate of flow of water into the mixer 151, an increase in the pressure of the air in pipe 166 is called for. For this purpose, the motor 170 is called upon to rotate stem 171 in a direction to increase the tension on spring 172. This increased tension will force the diaphragm 173 downwardly in the chamber 177 against the pressure of the air therein and hence open more widely the spacing between the valve plug 175 and the valve seat 176. This results in an increased rate of air transfer from input air line 174 into chamber 177. This increased rate of air transfer will build up the pressure in chamber 177 and tend to lift the diaphragm 173 to close or narrow the opening between valve plug 175 and valve seat 176 as the pressure in chamber 177 reaches desired level. Accordingly, the pressure of the air in chamber 177 and in the pipe 176 will increase proportionately until equilibrium is achieved. To reduce the air pressure in pipe 166 and hence tend to close valve 165, stem 171 is backed off from the spring 172 by reversing the direction of rotation of the motor 170 to reduce tension on the spring 172 with converse results on the regulation of the pressure in chamber 177.

Motor 170 drives worm 181 and worm wheel 182 connected through shaft 183 to the miter gears 184, 185, the latter being splined to the shaft 171. Miter gear 185 is biased into meshing engagement with miter gear 184 by spring 186 but may be retracted from meshing engagement to permit relative rotation of the miter gear 185 and its shaft 171 with respect to the miter gear 184 in the course of initial adjustment of the apparatus.

Worm 181 is connected on an axial extension thereto to threaded shaft 187, which is in threaded engagement with rearward extension 188 of carrier 190 for the photocell switching unit 191. This unit functions in a manner equivalent to the functioning of the mechanical contact switching unit shown in FIG. 2. The carrier extension 188 is guided for vertical movement on the guide posts 192. Extension 188 has a rearwardly projecting lug 193 disposed for travel between the actuating arms 194, 195 of the upper and lower limit microswitches 196, 197. These correspond to the limit switches 84, 79 shown in FIG. 2.

The photocell unit 191 consists of two photocells 200, 201, which are normally spaced slightly along the axis of vertical movement of the armature 202 of the triple coil relay 203, which, in this embodiment of the invention, performs a function similar to that of the dual coil relay 30 shown in FIG. 2.

Figure 15:
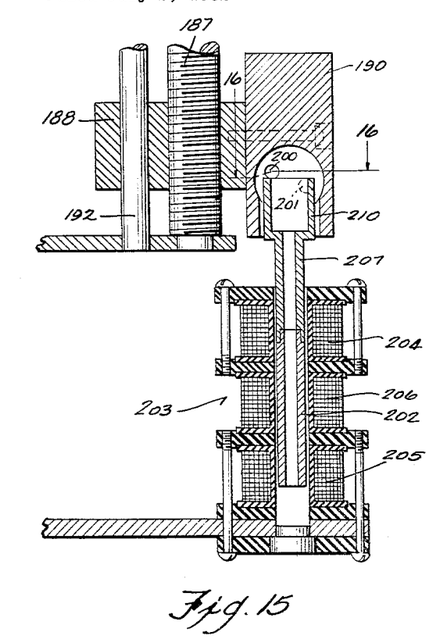
FIG. 15 is a vertical cross section taken through the triple coil relay and portions of the photocell unit of the embodiment of FIGS. 8 and 9.
Figure 16:
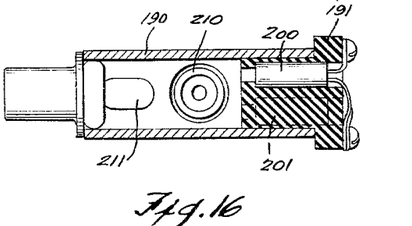
FIG. 16 is an enlarged cross section taken along line 16—16 of FIG. 15.

As best shown in FIG. 15, the triple coil relay has an upper coil 204 connected to the moisture responsive elements of the probe 150 and a lower coil 205 connected to the temperature responsive elements of probe 150. There is a center coil 206 which is separately energized at a selectively adjustable level, as will hereinafter be described. Coil 206 is intended primarily to generate lines of magnetomotive force exerting an upward thrust on the armature 202 substantially balancing the armature against the downward force of gravity. Accordingly, the armature will "float" on its axis independently of gravity. The energization of coil 206 may be varied to produce damping effects upon armature movement and for other purposes, as will be hereinafter described. In practical embodiments of the invention, each coil 204, 205, 206 has seventy ohms resistance.

The armature 202 is of ferromagnetic material and has an axially extending stem 207 of non-magnetic material such as aluminum, the upper end portion 210 of which is enlarged to selectively screen or mask the photocells 200, 201 from the light source 211.

While there is but a single light source 211, in further description herein the photocells 200, 201 will be referred to for convenience in description as receiving respectively upper and lower beams of light which are interrupted by the screen 210 in the course of relative axial movements of the screen 210 and carrier 190.

The range of relative movement between the carrier 190 and the screen 210 within which the upper and lower light beams are broken can be easily adjusted by rotating the cylindrical photocell unit 191 in its cylindrical socket in carrier 190. This will change the relative vertical spacing between the two light beams. After adjustment, the photocell unit 191 is fixed in position by the set screw 212. Adjustment of the light beam spacing is desirable to compensate for background or normal variations in armature movement due to mixer operation. The vertical spacing between the photocells is adjusted to make these normal variations ineffective to actuate the motor. The damping of the armature by the center coil 206 also de-emphasizes such background variation effect.

A third photocell 213 is provided. This photocell is also responsive to light emitted by the lamp 211 and functions to turn off the unit if the lamp burns out, as will hereinafter be described.

Figure 17:
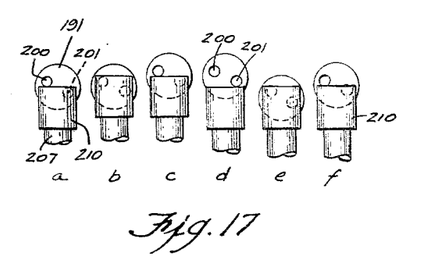
FIG. 17 is a diagrammatic view showing in various steps indicated as positions "a" through "f" respectively the relative positions of the photocell switch carrier and the switch actuator mounted on the armature of the triple coil relay, for successive conditions of controller operation.

As indicated in FIG. 17, position "a," the normal position of the screen 210, when the flow rate of the water through pipe 160 exactly balances the water requirements of the material in mixer 151, is below the upper light beam and above the lower light beam. This breaks the lower beam and leaves the upper beam unbroken.

Figure 11A:
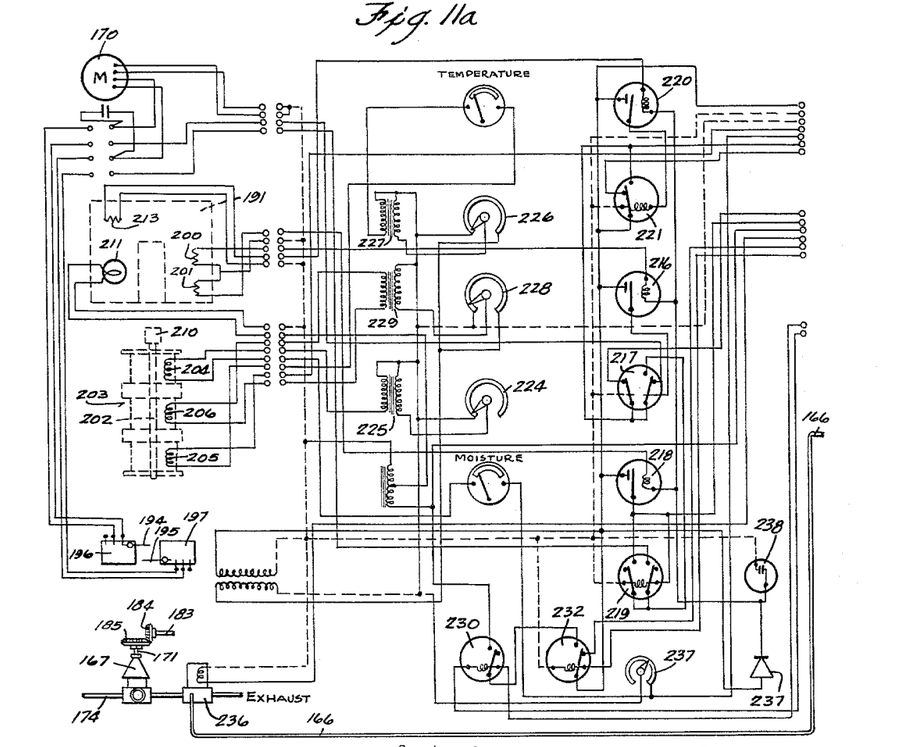
FIGS. 11a and 11b are each fragmentary circuit diagrams of the electrical and pneumatic apparatus used in connection with the embodiment of FIGS. 8 and 9. These figures can be integrated along a common terminal strip, which is shown in the drawing at the right side of FIG. 11a and at the left side of FIG. 11b, to complete the circuitry.
Figures 11B, 12:
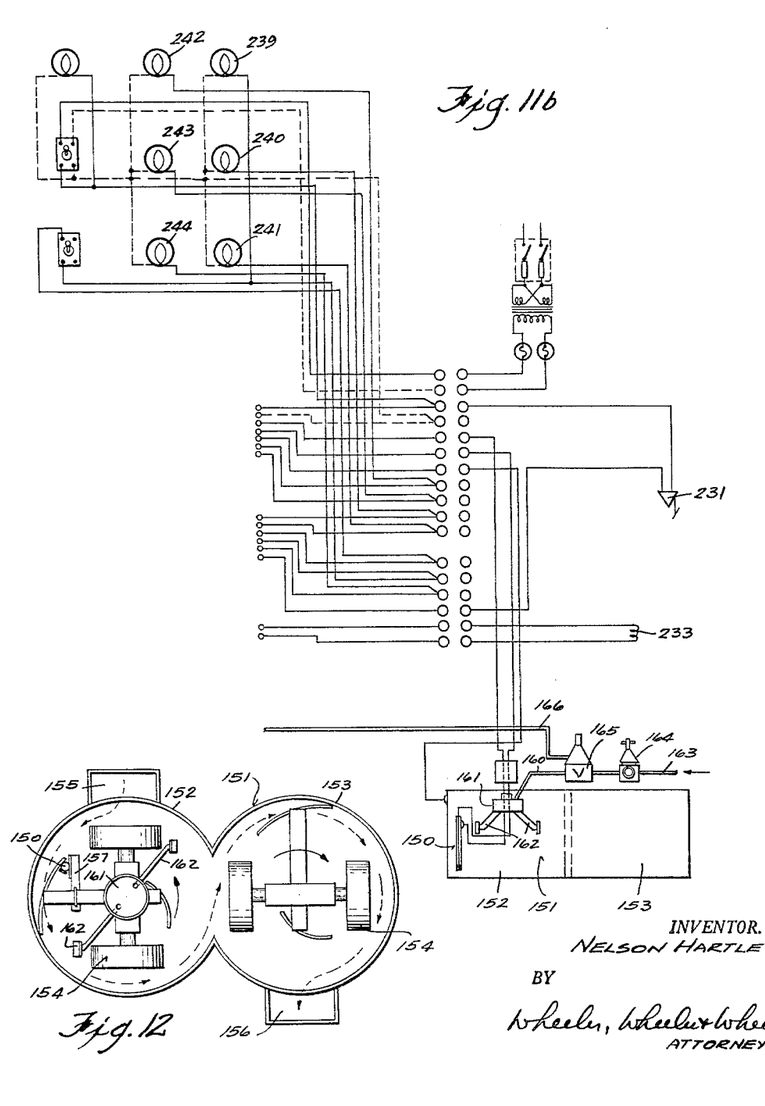
FIG. 12 is a somewhat enlarged plan view of one form of continuous mixer shown in FIG. 11b.

As the moisture content of material in mixer 151 increases and the armature 202 is accordingly raised by the increase in energization of the top coil 204 of the relay 203, screen 210 rises to break the upper light beam, as shown at position "b" in FIG. 17, and relay 216 in the circuit of FIG. 11 is deenergized, thus allowing the relay 217 to be de-energized and energize motor 170 in the up direction for concurrently raising the photocell block 191 and decreasing air pressure through the regulator 167. The rate of water flow into the mixer will slow correspondingly.

As soon as the motor 170 raises the photocell block 191 enough to clear the light beam to the top photocell, as shown at position "c" in FIG. 17, relay 216 will again become energized and energize relay 217 and stop the motor 170. This will leave the apparatus in equilibrium at a water flow rate lower than its initial rate.

If moisture content of the material continues to increase, the armature will rise still further, thus repeating the sequence from position "a" to "c" in FIG. 17 and still further reducing the rate of water flow. Substantially the same sequence occurs if the temperature of the material decreases. The energization of coil 205 will decrease, thus reducing the down thrust on the armature 202 and permitting the upthrust created by coil 204 to raise the armature in the foregoing sequence.

If the moisture content of the material should decrease, or its temperature increase, the net thrust on the armature will be such as to cause it to be drawn down. This results from decreased energization of coil 204, or increased energization of coil 205, which is wound in a direction to urge armature 202 downwardly. When the armature drops low enough to clear the screen 210 from the path of the lower beam to the photocell 201, as shown at position "d" in FIG. 17, relay 218 will be energized.

When relay 218 becomes energized, it will energize relay 219 and energize motor 170 in its down direction to concurrently lower the photocell block 191 and increase the air pressure in line 166 through the pressure regulator 167. When the motor 170 starts turning to lower the photocell block 191, it will continue to turn until the upper beam to photocell 200 if broken, as shown at position "e" in FIG. 17. This will de-energize relays 216 and 217 and stop the motor. As soon as relay 217 is de-energized, motor 170 will start in the opposite direction and will raise the photocell block 191 enough to clear the upper beam for photocell 200, as shown at position "f" in FIG. 17, and again stop the motor. Meanwhile, the increased air pressure in line 166 has opened valve 165 to increase the flow rate to balance the moisture requirement of the material.

With this arrangement, regardless of whether the motor is lowering or raising, the photocell block 191 will always take its final position in response to clearing of the upper photocell beam. This makes it possible to maintain close tolerance on the air pressure supplied to the water valve 165.

Photocell 213 is used only as a safety device. Bulb 211 in the photocell block 191 must be illuminated to energize photocell 213 and thence energize relays 220 and 221. If lamp 211 burns out, relays 220 and 221 will drop out and de-energize the circuit to motor 170. This will also produce a signal that the lamp is off.

The circuit through the moisture coil 204 in the triple coil relay is controlled through a variable transformer 224 and a secondary 25-volt transformer 225. The circuit through the temperature coil 205 is controlled through a variable transformer 226 and a secondary 25-volt transformer 227. The circuit through the balancing coil 206 is controlled through a variable transformer 228 and a secondary 25-volt transformer 229.

There are limit switches 196, 197 mounted adjacent the photocell block for each direction of travel. If for any reason one of the control relays should fail to function, the unit will travel only far enough to trip the appropriate limit switch, the actuation of which will de-energize motor 170.

Relay 230 is connected to a paddle switch 231 on the supply belt or apron feeder supplying the material to the mixer. Unless there is material on this supply belt, relay 230 will become de-energized and de-energize the photocell bulb 211, thus to de-energize the motor circuit.

Relay 232 is connected in parallel with the coil 233 in the mixer starter. With this arrangement it is a prerequisite to operation that coil 233 is energized and that the mixer 151 is running before the control circuit is energized and the valve 165 opened.

There is a three-way solenoid actuated valve 236 installed in the air line 166 between the pressure regulator 167 and the water valve 165. When valve 236 is de-energized, it will instantly shut off the air supply from the regulator 167 and exhaust the air in the water valve 165, allowing the water valve 165 to close.

If the mixer should stop, relay 232 will drop out to open air exhaust valve 236 and shut off valve 165. If the supply of material is exhausted, relay 230 will drop out to open air exhaust valve 236 and shut off valve 165.

Rheostat 237 is used for a shunt circuit through the top coil 204 of the triple coil relay. This rheostat 237 may be varied in resistance from 250 to 2500 ohms depending on the type of material and the amount of current needed through the material for controlling the relay.

Relays 216, 218 and 220 are desirably D.C. relays. They are supplied through a half-way rectifier 237 and capacitor 238.

Various pilot lights, etc., are provided, as shown in FIG. 11b. For example, pilot light 239 indicates that valve 165 is open. If the valve is closing, pilot light 240 will be illuminated and if the valve is opening, pilot light 241 will be illuminated. If the photocell lamp 211 is illuminated, pilot light 242 will glow and if photocell lamp 211 is extinguished, pilot light 243 will glow. If the supply of material subject to the pressure switch 231 is exhausted, thus to de-actuate the switch, pilot light 244 will glow.

Figures 13, 14:
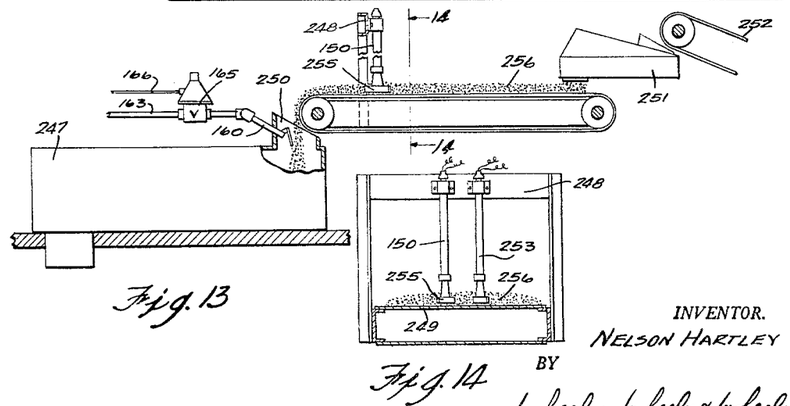
FIG. 13 is a somewhat diagrammatic view of a different form of continuous mixer and in which the temperature and moisture probes are mounted on a conveyor belt supplying material thereto.
FIG. 14 is a cross section taken along the line 14—14 of FIG. 13.

In FIGS. 13 and 14, a somewhat different form of continuous mixer is illustrated. The mixer 247 is of the type in which there is no room therewithin for mounting the temperature-moisture probe. Accordingly, the probe 150 is mounted on a bracket frame 248 over a belt conveyor 249 which functions as a moving container for the material and which supplies material 256 to the inlet port 250 of the mixer 247. The sensing portions 255 of the probe are immersed in the material 256 on the conveyor belt 249. Material 256 is conventionally added to the conveyor through a hopper 251 supplied by the conveyor 252. Probe 253 provides a ground return.

Accordingly, the probe 150 senses moisture and temperature of the material immediately prior to its admission into the mixer. Water is added through pipe 160 through valve 165 controlled by the same circuitry as hereinbefore disclosed.

Variable transformers 224, 226, 228 are initially adjusted to establish the normal energization of coils 204, 205, 206. The energy level of coils 204, 205 will subsequently vary according to the moisture and temperature of the material as sensed by the probe 150. The energy level of coil 206 will remain constant, subject only to manipulation of the variable transformer 228. For most purposes, coil 206 is energized sufficiently to exactly balance the force of gravity on the armature and float the armature substantially at its position shown in FIG. 15. The armature is now capable of movement in both directions along its longitudinal axis, thus to respond to changes in either material moisture or material temperature, or the net difference therebetween. This is unlike the relay construction shown in FIG. 1 in which, in the absence of energization of coil 35, gravity will drop the armature onto the bottom plate of the relay and subsequent changes in material temperature will be ineffective to change the position of the armature.

It is clear from the foregoing that the provision for the center or balancing coil 206 greatly increases the range of response and sensitivity of the relay. Moreover, under certain circumstances, it may be desirable to change the energization of the center coil 206 to damp armature movement in response to the thrust of the upper and lower coils.

The apparatus herein disclosed is also useful as an indicator or recorder of moisture content of the material. The air pressure in line 166 has a direct relation to the moisture content of the material. Accordingly, air pressure gauge 257 of FIG. 8 can be calibrated in terms of percent moisture content, as well as p.s.i. If the moisture content of the finished material is of interest, a controller embodying the present invention is positioned with its probe 150 at the outlet of the mixer. If the moisture content of incoming material is of interest, the probe 150 is positioned at the mixer inlet.

The gauge 257 can be replaced by or supplemental with any conventional recorder to make a continuous written record of moisture content. The gauge or recorder can also be adapted to respond to turning movement of shaft 171, as this bears an ascertainable relation to the air pressure and moisture content.

I claim:

1. Apparatus for controlling the addition of water to finely divided granular material undergoing continuous movement through a mixer, said apparatus comprising:
   a source of water,
   a valve controlling water flow from said source to said material,
   valve regulating mechanism including a reversible motor and mechanism driven by the motor to move the valve toward open or closed position respectively in accordance to the direction of motor operation,
   a moisture sensitive probe exposed to the continuously moving, finely divided granular material,
   motor energizing means including a coil connected to said moisture sensitive probe for selectively tending to drive the motor in one direction when coil energization is increased and tending to drive the motor in the opposite direction when coil energization is decreased, whereby to increase or decrease the water flow through the valve in accordance with changes in the moisture content of the material as sensed by the probe,
   follower means responsive to motor movement to de-energize the motor after an incremental movement thereof whereby to limit the valve to like incremental movement,
   a temperature sensitive probe exposed to the continuously moving material,
   said motor energizing means including another coil connected to the temperature sensitive probe for selectively tending to drive the motor in one direction when said other coil energization is increased and tending to drive the motor in the opposite direction when said other coil energization is decreased, whereby to increase or decrease the water flow through the valve in accordance with the changes in the temperature of the material as sensed by the temperature sensitive probe.

2. The apparatus of claim 1 in which said motor energizing means further comprises a moving armature subject to said coil, said follower means comprising a movable switch carrier having a driving connection from said motor to be actuated concurrently with said valve, switch means on said carrier in operative circuit controlling connection with said motor, and a switch actuator on said armature, whereby the actuation of the said switch means will depend on the relative positions of the armature and the carrier.

3. The apparatus of claim 2 in which said switch means includes switch elements respectively connected with the motor for the forward and reverse actuation thereof.

4. The apparatus of claim 2 in which said switch means comprises mechanical contacts mounted on said carrier for movement therewith.

5. The apparatus of claim 2 in which said switch means comprises a photoelectric cell mounted on the carrier for movement therewith, said switch actuator comprising an opaque screen movable by said armature to mask said cell.

References Cited by the Examiner

UNITED STATES PATENTS

| 359,101 | 3/1887 | Shallenberger | 318—31 X |
|---|---|---|---|
| 668,978 | 2/1901 | Carlson | 317—190 X |
| 957,870 | 5/1910 | Cubitt | 200—102 |
| 1,091,630 | 3/1914 | Carichoff | 200—102 |
| 1,354,152 | 9/1920 | Whittaker | 317—190 |
| 1,651,852 | 12/1927 | Trenor | 318—31 |
| 1,694,121 | 12/1928 | Granat | 318—31 |
| 1,767,588 | 6/1930 | Hutton | 137—90 |
| 1,989,972 | 2/1935 | Cunningham | 318—31 |
| 2,108,775 | 2/1938 | MacGeorge | 317—190 X |
| 2,248,730 | 7/1941 | Wood. | |
| 2,273,126 | 2/1942 | McGillin | 22—89 |
| 2,339,289 | 1/1944 | Olken | 137—88 X |
| 2,348,177 | 5/1944 | Keeler | 318—31 X |
| 2,379,029 | 6/1945 | Naud | 317—190 X |
| 2,425,551 | 8/1947 | McKay | 251—133 X |
| 2,449,901 | 9/1948 | Kaiser | 317—188 |
| 2,715,704 | 8/1955 | Carrick | 318—31 |

(Other references on following page)

UNITED STATES PATENTS

| | | | |
|---|---|---|---|
| 2,717,340 | 9/1955 | Waters | 317—188 |
| 2,845,008 | 8/1958 | Dietert. | |
| 3,092,882 | 6/1963 | Dietert | 137—90 X |

FOREIGN PATENTS 591,040    8/1947    Great Britain.

OTHER REFERENCES

Chemical Engineering, June 1957, pages 302–305 relied on.

M. CARY NELSON, *Primary Examiner.*

ISADOR WEIL, *Examiner.*

A. JAFFEE, E. FEIN, *Assistant Examiners.*